United States Patent [19]

Guastadini

[11] Patent Number: 4,678,974
[45] Date of Patent: Jul. 7, 1987

[54] PULSATING CURRENT ELECTROMOTOR WITHOUT COMMUTATOR

[76] Inventor: Fausto Guastadini, Frazione Tuffo Centro, 6, 14023 Cocconato (AT), Italy

[21] Appl. No.: 865,902

[22] Filed: May 14, 1986

Related U.S. Application Data

[63] Continuation of Ser. No. 668,166, Nov. 1, 1984, abandoned.

[30] Foreign Application Priority Data

Nov. 7, 1983 [IT] Italy .............................. 68156 A/83

[51] Int. Cl.⁴ ............................................ H02K 29/10
[52] U.S. Cl. ..................................... 318/254; 318/480
[58] Field of Search ................... 318/138, 254 A, 254, 318/439, 480; 310/156, 180, 184, 198, 68 R

[56] References Cited

U.S. PATENT DOCUMENTS

| | | | |
|---|---|---|---|
| 3,200,315 | 8/1965 | Thompson | 318/138 |
| 3,230,434 | 1/1966 | Bauerlein | 318/254 A X |
| 3,559,013 | 1/1971 | Burch et al. | 318/138 |
| 3,559,014 | 1/1971 | Pakes | 318/138 |
| 3,878,415 | 4/1975 | Wesolowski | 310/184 |
| 4,011,487 | 3/1977 | Loomis | 318/254 X |
| 4,409,524 | 10/1983 | Nielsen et al. | 318/138 |
| 4,496,887 | 1/1985 | Ichihara et al. | 310/184 |

Primary Examiner—William M. Shoop, Jr.
Assistant Examiner—Bentsu Ro
Attorney, Agent, or Firm—Young & Thompson

[57] ABSTRACT

A pulsating current electromotor without commutator comprises a permanent magnet type or electromagnetic type rotor keyed on a rotating shaft and having the poles diametrically opposite to one another relative to the shaft on which they extend for the greater part of its circumference. The poles have opposite polarity with respect to one another and face a stator member which is formed by a substantially cylindrical hollow body, within which the rotor is arranged. Formed in the stator body are stator slots uniformly spaced from one another, each of which is arranged to contain stator bifilar windings which, at the outlet from each slot are directed half in one direction and half in the opposite direction. Further provided are optical detector systems detecting the angular position of the rotor, connected to electronic controlling circuits which control distribution members for distributing the power to the stator windings as a function of the angular displacements of the rotor. The components of the machine receive supply from a rectified or direct current network.

3 Claims, 31 Drawing Figures

PULSATING CURRENT ELECTROMOTOR WITHOUT COMMUTATOR

This application is a continuation of application Ser. No. 668,166, filed 11/1/84, now abandoned.

The invention relates to a pulsating current electric machine with a permanent magnet type or electromagnetic type rotor. More particularly, the subject of the invention is an electric motor supplied with direct or rectified alternating current, in which the rotor is formed either by permanent magnets having no windings or by a rotor with poles having a winding; either of the rotors employed is mounted on a rotating shaft, and arranged around the rotor is a hollow cylindrical stator provided with windings. The permanent magnet type or electromagnetic type rotor formed in this manner is not provided with the commutator that is usually connected to the armature with which it forms the rotor, whilst, in the case of the rotor being of the type with permanent magnets, it does not even possess the so-called brushes of the conventional commutator.

BACKGROUND OF THE INVENTION

Schematically, the conventional direct current electric machines are formed by a stator and a rotor, both of which are made of iron; generally, the stator supports the inductor windings, whilst the rotor supports the induced windings.

The stator costitutes almost always the outer part of the machine and generally it is formed by a ring (or core), towards the inside of which the poles, each provided with excitation windings made of copper, project.

The rotor, usually of massive structure owing to the excitation by direct current, is a rolled-iron cylinder keyed on a shaft resting on supports. Formed in the peripheral zone of the rotor, near the air gap, are stator slots in which the induced winding is housed. This latter is connected, by means of conductors, to a cylinder-shaped commutator, with segments insulated with respect to each other, also inserted into the shaft. Resting on the outer surface of the cylinder are the brushes having, extending therefrom, the conductors leading to the terminals of the machine. The operation of this conventional machine being well-known to those skilled in the art, will not be described herein.

As can be seen, this machine requires various components, the most delicate of which structurally are the rotor provided with a winding, the commutator with segments made of copper and insulated from each other, and the brushes formed by blocks of conductive material. All this implies a careful working of the various components, a quite high cost thereof and a constant maintenance of the machine to always keep each component thereof in a perfectly efficient condition so as to maintain the efficiency of the machine itself.

SUMMARY OF THE INVENTION

The present invention proposes an electric machine based on a new concept and which allows first of all the omission of the commutator and in one embodiment will allow providing a type of rotor that will not require any kind of windings thereon, the whole affording a consequent undoubted saving in the consumption of materials, in the assembly of the components and in the maintenance which is thus reduced to simple checks on an extremely reliable machine.

Another object of the invention is to provide an electric machine having, other characteristics being equal, much higher efficiency than that of the prior art electric machines, thereby avoiding any danger of overheating during its operation, even at peak r.p.m. For attaining these and other objects which will be better understood from the following description, the invention proposes the provision of a pulsating current electric motor having no commutator, characterized in comprising a rotor, keyed on a rotating shaft, provided with poles diametrically opposite to one another relative to the shaft itself on which they extend for the greater part of its circumference, the poles having an opposite polarity with respect to one another and being disposed facing a stator member formed by a substantially cylindrical hollow body, within which the rotor is arranged; in the stator body there being formed stator slots uniformly spaced from one another, each of which is arranged to contain stator bifilar windings which, at the outlet from each slot, are directed half in one direction and half in the opposite direction; detector means being provided for detecting the angular position of the rotor, connected to electronic means controlling the distribution of the power to the stator windings as a function of said angular displacement of the rotor; the components of the machine receiving their supply from a network.

BRIEF DESCRIPTION OF THE DRAWINGS

Two preferred embodiments of the machine according to the invention will now be described by way of non-limiting examples with reference to the accompanying drawings, in which.

DETAILED DESCRIPTION OF THE PREFERRED EMBODIMENTS

Figure 1:
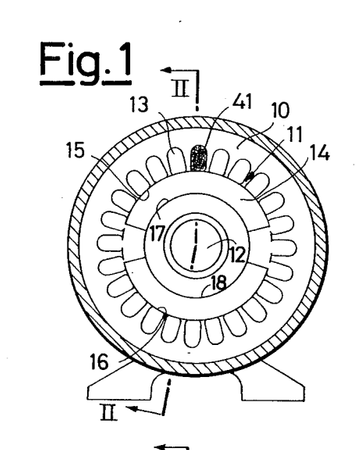
FIG. 1 is a sectional view taken along the line I—I of FIG. 2, showing the electric machine according to a first embodiment of the invention.
Figure 2:
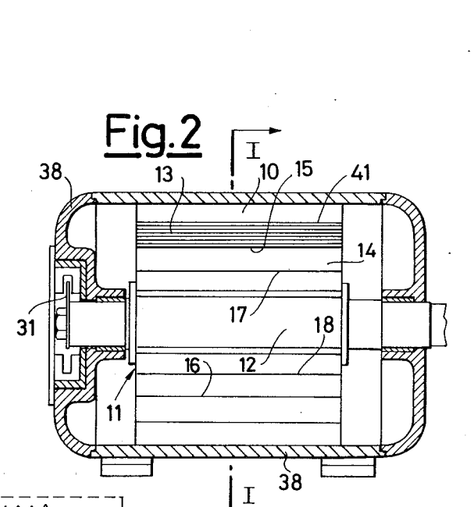
FIG. 2 is a sectional view taken along the line II—II of FIG. 1.

The pulsating current motor proposed by the invention is provided substantially with a hollow cylindrical fixed member or stator 10 and a rotating member or rotor 11 fixed to a shaft 12 within and coaxially with the stator 10 (see FIGS. 1 to 4). Stator 10 is formed by a cylindrical ring, which may be of a rolled structure, i.e. formed by the superposition of the edges of a plurality of plate sectors or discs insulated from one another by means of paper or varnish, in order to reduce the losses by eddy currents. Within the inner part of the stator near the air gap there are formed, parallel to the axis of the machine (hence along the generatrices of the inner cylindrical surface of the stator), the stator slots 13 intended to contain the conductors or windings forming the induced circuit. Rotor 11 may be one of two types: the first, shown in FIGS. 1 and 2, is formed by two permanent magnet open rings 14, keyed on the shaft 12, in such a way that on their outer surfaces 15 and 16 there will appear a "north" and a "south", respectively, and the opposite, i.e. a "south" and a "north" will appear on the corresponding inner surfaces 17 and 18 contacting the shaft 12.

Figure 3:
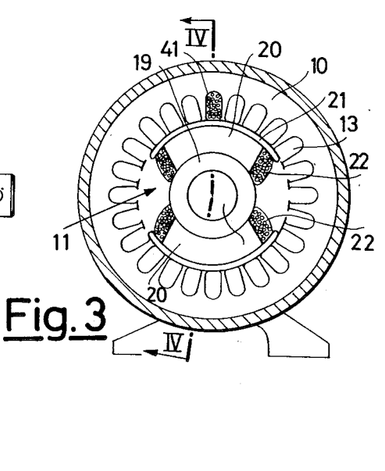
FIG. 3 is a sectional view taken along the line III—III of FIG. 4, showing a second embodiment of the electric machine according to the invention.
Figure 4:
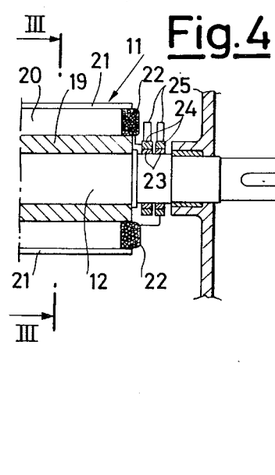
FIG. 4 is a sectional view taken along the line IV—IV of FIG. 3.

In the second embodiment shown in FIGS. 3 and 4, instead, the rotor 11 is of the type with an electromagnet formed by a boss 19, keyed on the shaft 12, extending from which are poles 20 which widen towards the air gap with pole pieces or shoes 21, and on which there are wound inductor windings 22. The poles 20 are magnetized by direct current and may have a monolithic structure or be made of a bundle of stampings. The windings 22 are insulated electrically from the poles 20 and are supplied through a system of sliding contacts formed by two continuous rings 23 fixed on the shaft 12 and insulated electrically therefrom; resting on the rings 23 are the brushes 24 at which there arrive the feeding conductors 25 (FIG. 4).

Figure 5:
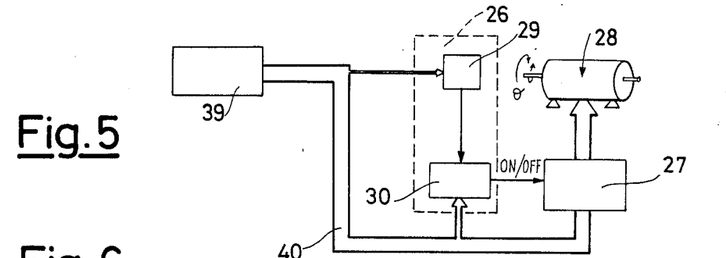
FIG. 5 is a block diagram of the machine with the respective feeding, distribution and power circuits.

From the electric point of view, the motor may be considered as being formed essentially by three parts: an electronic control circuit 26, a distribution circuit 27 for distributing the power, and the stator windings (as can be seen in FIG. 5).

For the motor with an electromagnetic rotor, in addition to the parts mentioned above, there should be considered also a direct current excitation circuit provided on the rotor.

In FIG. 5, reference numeral 39 indicates the supply from a network, while reference numeral 40 identifies the flow of power.

Figures 6, 7:
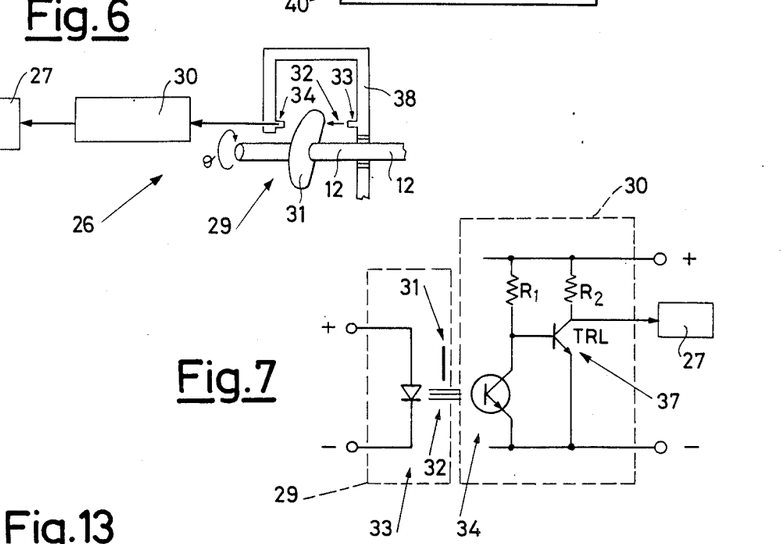
FIG. 6 is a diagrammatic view of the machine control circuit.
FIG. 7 is an electric diagram of the machine control logic.

As can be seen from FIG. 6, the control circuit 26 is formed by a mechanical portion 29 and an electronic portion 30. The mechanical portion is formed by one or more opaque segments 31 keyed on the shaft 12 and therefore rigidly connected to it.

Figure 24A:
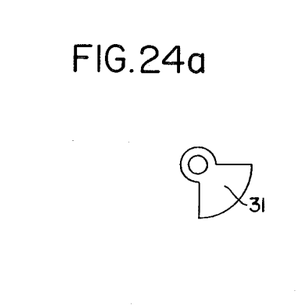
FIGS. 24a, 24b, and 24c show the configuration of the segment 31 corresponding to 4, 2, and 3 windings, respectively.
Figure 24B:
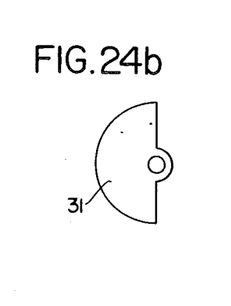
Figure 24C:
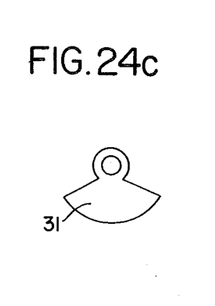

The segments 31 are designed (as can be seen in FIGS. 2, 6 and 24) so as alternately to interrupt and let pass a beam of light 32 directed from a transmitter 33 to a receiver 34, both of them being mounted on the stator body 38.

The electronic portion 30 of the control circuit (FIG. 7) is connected to a control circuit 27 for the distribution of power, and comprises the phototransistor receiver 34 which receives the beam of light from the emitter diode 33 when the segment 31 does not interrupt it during the rotation $\theta$ of the shaft 12. From the phototransistor 34, through the pre-amplifier 37, the control logic controls the power distributor 27. This latter is shown in two possible embodiments thereof identified in FIG. 8 as SCR circuit, and in FIG. 9 as transistor circuit.

In both cases, the power distributor 27 is substantially a static switch which must allow the arrival of current to the stator winding when the segment 31 keyed on the shaft 12 interrupts the optical circuit 32.

Figure 8:
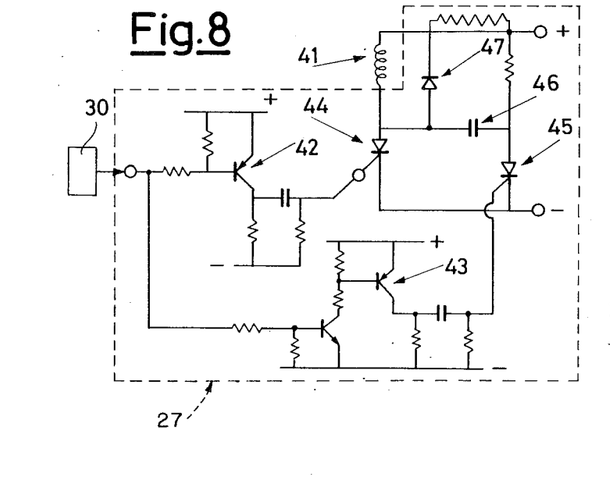
FIGS. 8 and 9 are two alternative embodiments of the power distributor 27 of the machine.

In the circuit illustrated in FIG. 8 there are shown essentially two signal amplifiers 42 and 43, a power SCR 44, a tripping SCR 45, a tripping capacitor 46 and a diode 47 for discharging the stator winding coils 41.

Figure 9:
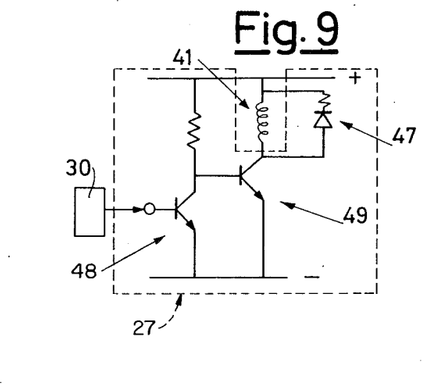

In FIG. 9 there is shown a different way to activate the stator winding 41, i.e. there is a power transistor 49 and the diode 47 for discharging the coils is in parallel with the stator winding 41.

It is obvious that both circuits shown in FIGS. 8 and 9 are given by way of non-limiting example only, inasmuch as the power electronics may be provided in various manners without departing from the scope of the invention.

As shown in FIGS. 1, 2 and 3, the stator windings 41 are imbricated or of the lap-winding type and contained in each of the twenty-four stator slots formed in the body 10. Obviously, the stator slots may be more or less than 24, and hereinafter reference will be made to this latter embodiment only by way of example.

The coils forming the windings 41 are of the bifilar type, i.e. the conductors contained in each slot 13 form two separate elements.

Figure 10A:
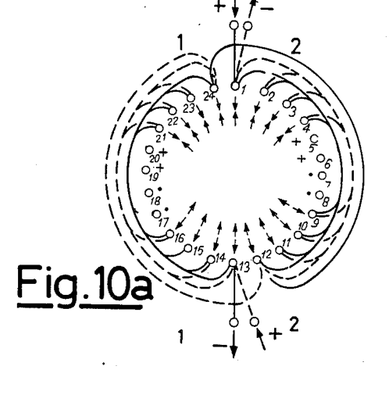
FIGS. 10a, 10b and 11a, 11b are diagrams showing the stator windings in two different embodiments, respectively.
Figure 10B:
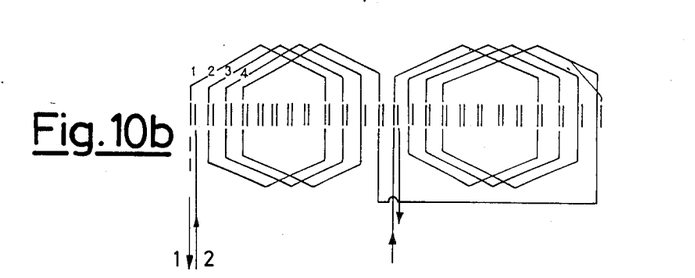

FIGS. 10a and 10b show a winding with 2 phases for a stator with 24 stator slots; to be noted is the winding having a bifilar, one for each phase.

Figure 11A:
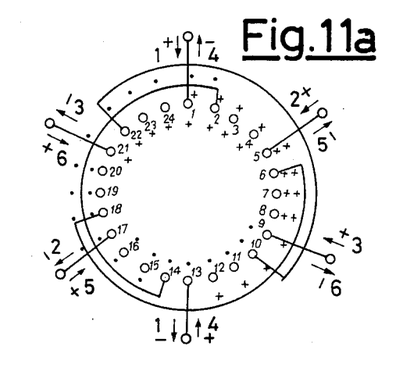
Figure 11B:
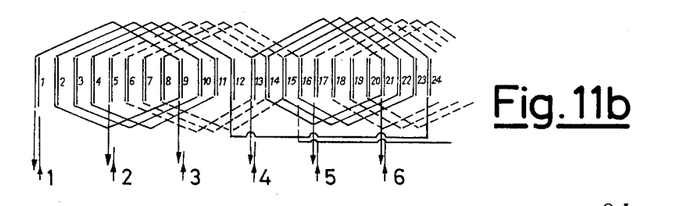

Instead, FIGS. 11a and 11b show 3 bifilar windings for 6 phases, still for a stator with 24 stator slots.

Figure 16A:
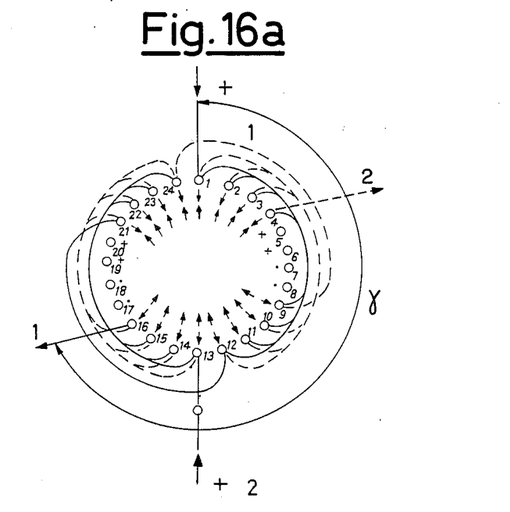
FIGS. 16a, 16b and 17a, 17b are diagrams showing the stator windings in two further embodiments, respectively.
Figure 16B:
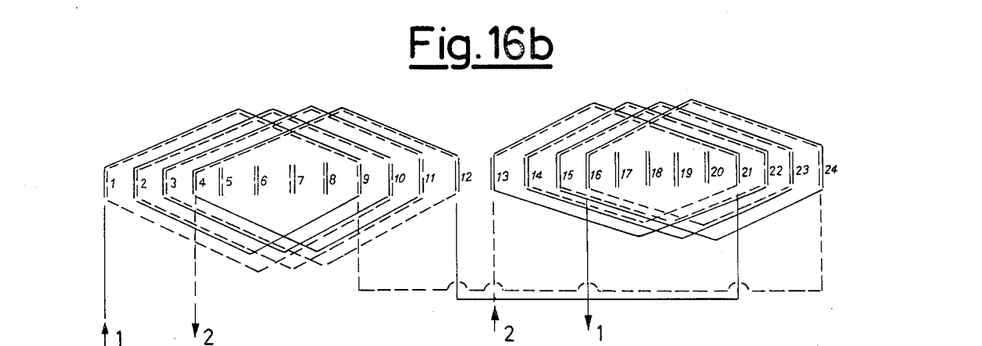

FIGS. 16a and 16b show, as a variant with respect to FIGS. 10a and 10b, not more than two phases with inlets and outlets spaced by 180° from one another, but only the inlets being spaced by 180° from one another and the outlets being disposed at an angle between 180° and 270° relative to the respective inlet, which, as indicated by results from tests which have been carried out, allows to further improve the efficiency of the motor as compared with the solution shown in FIGS. 10a and 10b.

Figure 17A:
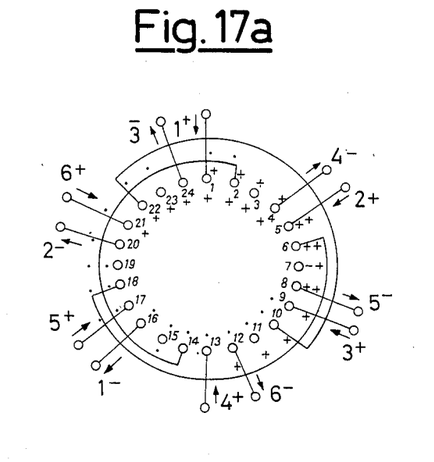
Figure 17B:
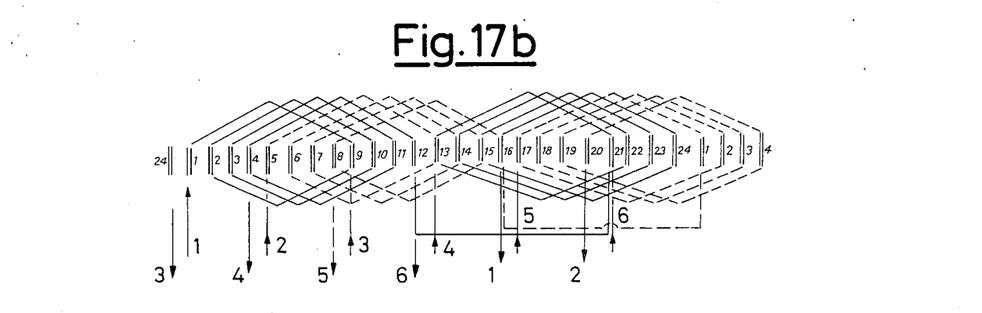

FIGS. 17a and 17b show a variant with respect to FIGS. 16a and 16b, with 3 bifilar windings for 6 phases still for a stator with 24 stator slots.

The operation of the motor is as follows.

The position sensor 29 detects the angular position (angle $\theta$ in FIG. 6) of the rotor relative to a suitable mark.

This information is transmitted to the control logic 30 which generates a pulse signal which controls the power electronics 27. This latter, in its turn, supplies energy to the winding 41 of the stator 10. The active conductors (in the stator slots 13) of the respective winding are traversed by a current which interacts with the magnetic field generated by the rotor 11, and therefore a torque is generated which is adapted to rotate the driving shaft 12.

For a more detailed explanation, let us suppose that the motor has a stator 10 formed by only one bifilar winding (i.e. two windings), as shown in FIGS. 10a, 10b or 16a, 16b.

In this case, the angular position detector 29 will be formed by a segment 31, as shown in FIG. 24(*b*), and two optical switches (each switch comprising elements 33, 34).

Each optical switch is coupled to the respective stator winding, so that each switch controls the inflow of current for each winding. For this reason, two phases or "channels" are mentioned.

Figure 12:
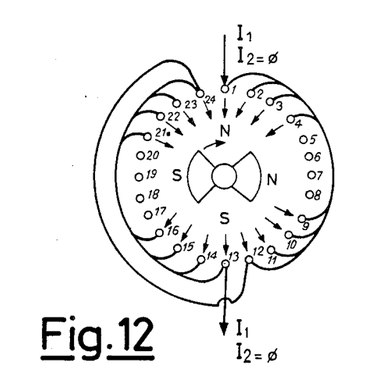
FIGS. 12 to 15 are diagrams showing the different positions of the rotor relative to the stator windings during the operation of the machine.
Figure 13:
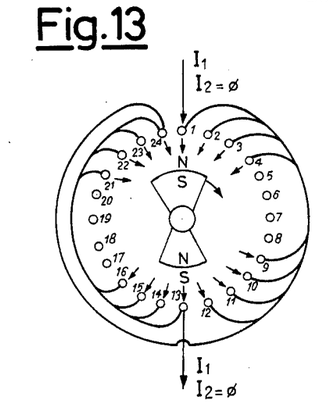
Figure 14:
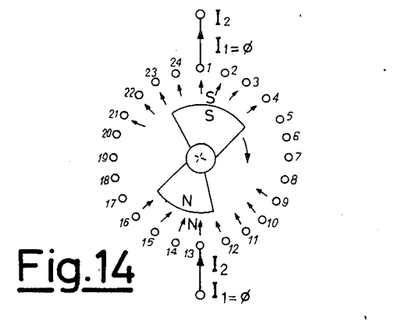
Figure 15:
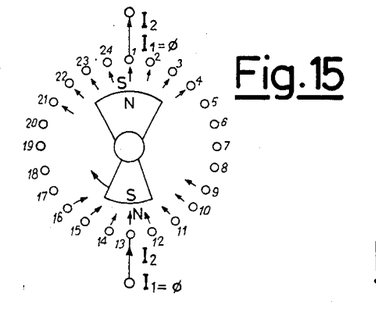
Figure 18:
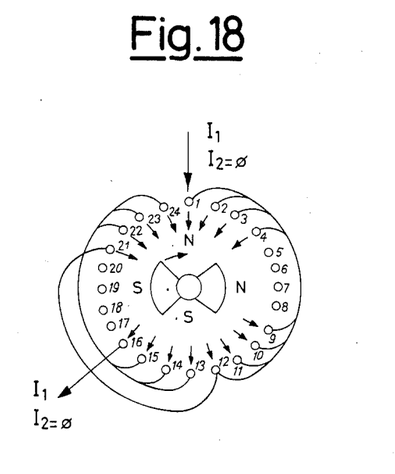
FIGS. 18 to 21 are diagrams of the different positions of the rotor relative to the stator windings in their embodiment shown in FIGS. 16a, 16b, 17a, and 17b.
Figure 19:
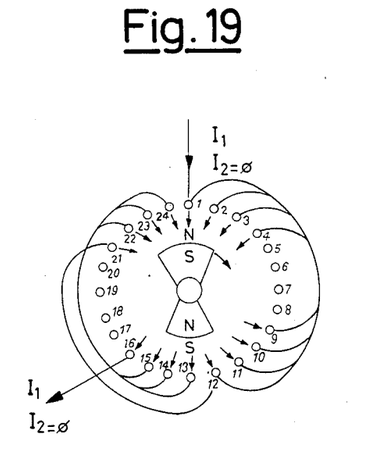
Figure 20:
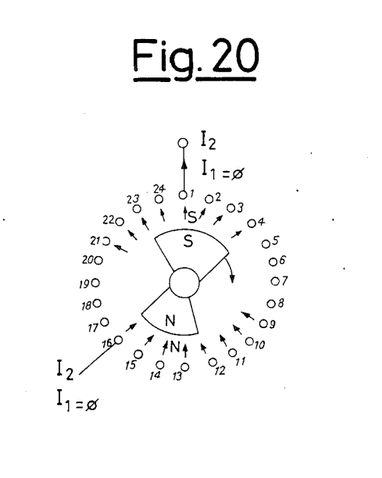
Figure 21:
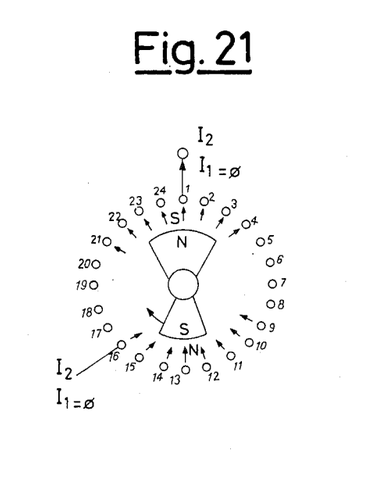

Let us suppose that the segment 31 has initiated the interruption of the optical circuit of the first switch. In this situation, the current is enabled to pass into the first winding which generates a magnetic field having the polarities indicated in FIGS. 12 or 18, respectively. This situation is maintained until the segment 31 interrupts the optical circuit of the first switch. Let us suppose also that the rotor 11 is positioned as shown in FIGS. 12 or 18, respectively, (the rotor being of either a permanent magnet type or of an electromagnetic type). The rotor 11 will then rotate to assume the position shown in FIGS. 13 or 19, respectively. It will be noted that during this period the winding 2 is not traversed by the current, therefore the current $I_2$ is indicated as "null" ($\phi$) in these figures. When the rotor will have reached the position shown in FIG. 14 or 20, respectively, the segment 31 will permit the passage of light into the first optical switch, and therefore the current in the winding 1 will be interrupted. Segment 31 now interrupts the optical circuit in the second switch and therefore in the winding 2 will begin the passage of current which generates a magnetic field as in FIGS. 14 or 20, respectively. The current $I_2$ will persist until the rotor 11 reaches the position shown in FIGS. 15 or 21, respectively. At this point the current $I_2$ will be equal to zero whilst the winding 1 will be traversed again by the current $I_1$. This will take place till the rotor will have reached again the position shown in FIGS. 13 or 19, respectively.

Thus, the rotation is ensured because the types of windings and the manner of feeding them permit a continuous commutation of the magnetic field.

Figure 22:
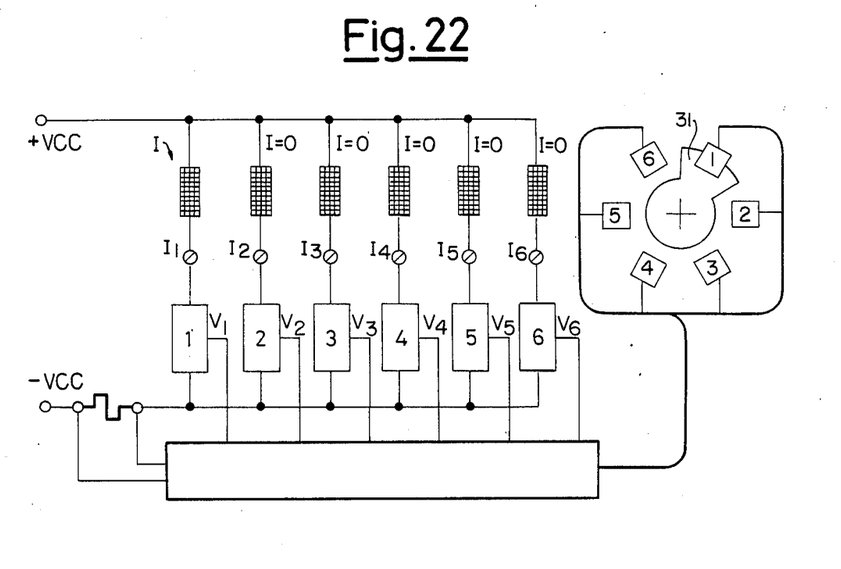
FIGS. 22 and 23 are, respectively, the block diagram and the time chart of the electric machine in the embodiment shown in FIGS. 17a, 17b.

It should be noted that the stator windings 41 are traversed by the current always in the same direction (the current $I_1$ flows in the winding 1 always in the same direction, and this happens also for the winding 2), i.e. there is no inversion of current in the same winding during the operation of the motor. (FIG. 22).

Figure 23:
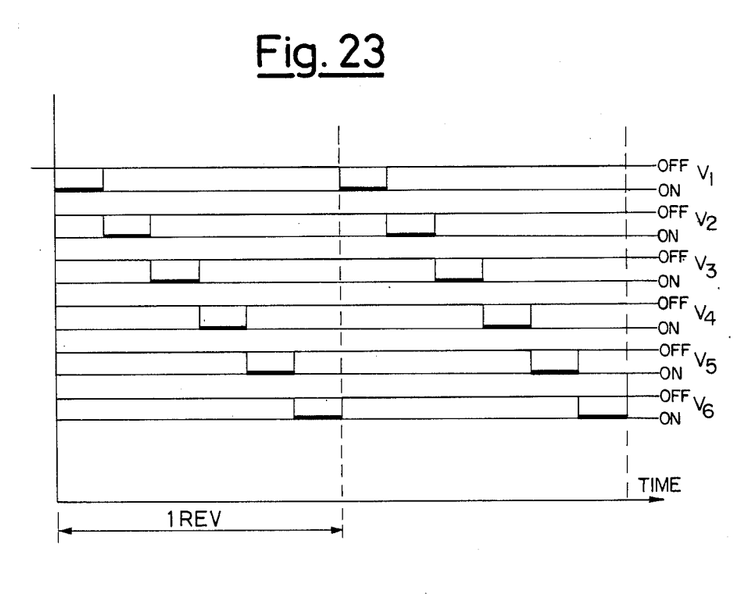

Furthermore, it is again noted that in FIGS. 3, 7, 8 and 9 are shown two different ways to activate windings 41 and 22, and they are represented by blocks 27, each of which functions the same as the other. In FIG. 23 there is shown the sequence of the driving voltage that allows the flow of current $I_1$ (FIG. 22) while segment 31 (FIG. 22) is shielding the photodiode position 1. The same situation will occur for $V_2$, $I_2$, $V_3$, $I_3$, etc.

In the case of 6 phases the situation is analogous, except that during a turn of the rotor each winding is fed for a period of time equal to about 1/6 of the time employed by the rotor for accomplishing a turn. (FIG. 23).

Finally, it should be noted that the number of phases may vary from 1 to 2, 3, 4 or more.

Figure 25:
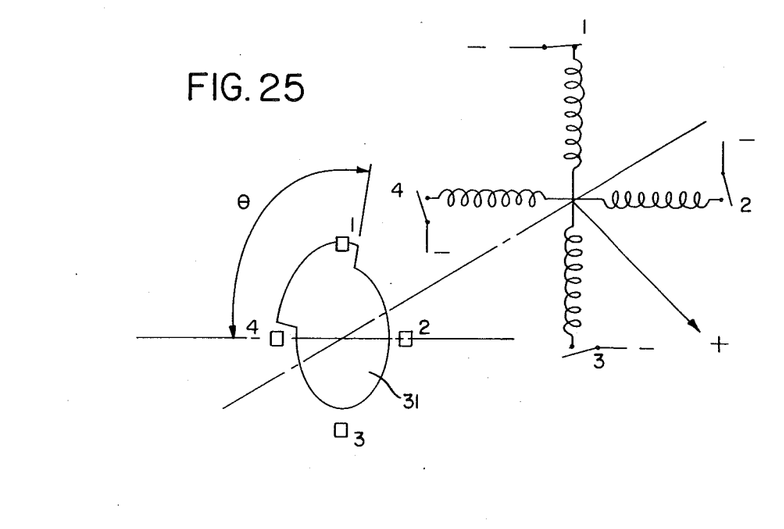
FIG. 25 shows the relationship among the phases and the configuration and orientation of segment 31 for the case of 4 windings.

The time switching among the phases is related to the sector dimensions of segment 31 and the relative detector position of the photodiodes (see FIG. 25). FIG. 25 shows the $\theta$ angle, before mentioned, where $\theta$ is the angle between, in this case, axis 4-2 of photodiodes and the leading edge of segment 31.

I claim:

1. A pulsating current brushless electric motor comprising: a rotor fixed to a rotating shaft, said rotor comprising magnetic poles diametrically opposed to one another relative to the shaft and extending over the greater part of the circumference of said shaft, the poles having an opposite polarity with respect to one another; a stator formed by a substantially cylindrical hollow body within which the rotor is arranged, the stator comprising stator slots uniformly spaced about the inner circumference of said stator, distinct stator multiple layer windings contained within said slots, each distinct stator winding following the internal perimeter of said stator slots so as substantially to cover the internal surface of the stator, and which, at the outlet from each slot, are traversed by current always in the same direction; detector means comprising an opaque member fixed to said shaft, said member having an arcuate extent equal to 360° divided by said number of windings, said member cooperating with photodiodes, one photodiode being associated with each of said multiple layer windings, such that said opaque member alternately interrupts and restores a beam of light transmitted by each of said photodiode, said photodiode further being uniformly distributed about the circumference of the shaft; electronic means controlling power distribution to the stator windings, said electronic means being responsive to the angular displacement of the rotor as communicated by the interruption of the photodiode beam corresponding to its associated stator winding; and a power source from which the motor components receive their power.

2. A motor according to claim 1, characterized in that the stator windings contained in each slot are two, each being traversed by current in an opposite direction with respect to the other.

3. A motor according to claim 1, characterized in that the windings of the stator are such that each active conductor of each winding has its symmetrical conductor at 180° and the conductors are traversed by the current in opposite directions with respect to one another; the active conductors traversed by the current in the same direction forming an arc of circumference of less than 180°.

* * * * *